United States Patent
Kasai et al.

(10) Patent No.: US 12,416,134 B2
(45) Date of Patent: Sep. 16, 2025

(54) REMOTE OPERATION DEVICE FOR A WORK MACHINE

(71) Applicant: HITACHI CONSTRUCTION MACHINERY CO., LTD., Tokyo (JP)

(72) Inventors: Shinya Kasai, Ibaraki (JP); Masamichi Ito, Ibaraki (JP); Shinjiro Yamamoto, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 264 days.

(21) Appl. No.: 18/023,513

(22) PCT Filed: Feb. 18, 2022

(86) PCT No.: PCT/JP2022/006559
§ 371 (c)(1),
(2) Date: Feb. 27, 2023

(87) PCT Pub. No.: WO2022/196242
PCT Pub. Date: Sep. 22, 2022

(65) Prior Publication Data
US 2023/0323630 A1  Oct. 12, 2023

(30) Foreign Application Priority Data
Mar. 15, 2021  (JP) .................. 2021-041732

(51) Int. Cl.
*E02F 9/20* (2006.01)
*G05D 1/00* (2024.01)
*G05D 1/224* (2024.01)

(52) U.S. Cl.
CPC ........... *E02F 9/205* (2013.01); *G05D 1/0038* (2013.01); *G05D 1/2247* (2024.01)

(58) Field of Classification Search
None
See application file for complete search history.

(56) References Cited

U.S. PATENT DOCUMENTS 9,441,985 B2 * 9/2016 Riley .................. G05D 1/0038
10,425,622 B2 * 9/2019 Brudnak .................. G06T 3/04
(Continued)

FOREIGN PATENT DOCUMENTS

JP  2012066724 A  4/2012
JP  2014004930 A  1/2014
(Continued)

OTHER PUBLICATIONS

International Search Report of PCT/JP2022/006559 dated May 10, 2022.

*Primary Examiner* — Todd Melton
(74) *Attorney, Agent, or Firm* — Mattingly & Malur, PC

(57) ABSTRACT

Provided is a remote operation device capable of remotely operating efficiently and safely a work machine that is operated from a remote location, even when a communication delay occurs. The remote operation device includes a communication control section 222 that receives a camera video image of a work site captured by a vehicle-mounted camera 91 and vehicle body information of the work machine (hydraulic shovel) 1, a predicted trajectory computing section 220 that computes a predicted trajectory of the work machine (hydraulic shovel) 1 from the vehicle body information and outputs predicted trajectory data to be displayed as a video image on a display device 202, and a display control section 221 that causes the display device 202 to display the camera video image and the video image of the predicted trajectory on the same screen (simultaneously).

5 Claims, 14 Drawing Sheets

(56) References Cited

U.S. PATENT DOCUMENTS

| | | | |
|---|---|---|---|
| 10,922,825 B2 * | 2/2021 | Zou | G06T 7/251 |
| 11,281,207 B2 * | 3/2022 | Lacaze | G05D 1/0038 |
| 12,241,226 B2 * | 3/2025 | Tanimoto | E02F 9/205 |
| 2020/0240110 A1 | 7/2020 | Takahama et al. | |

FOREIGN PATENT DOCUMENTS

| | | |
|---|---|---|
| JP | 2014071778 A | 4/2014 |
| JP | 2018152652 A | 9/2018 |
| JP | 2019054464 A | 4/2019 |
| JP | 2020132431 A | 8/2020 |
| WO | 2018/043299 A1 | 3/2018 |

* cited by examiner

REMOTE OPERATION DEVICE FOR A WORK MACHINE

TECHNICAL FIELD

The present invention relates to a remote operation device.

BACKGROUND ART

There is a technique of operating a work machine from a remote location (remote operation). In order to provide an operator who remotely operate the work machine from the remote location with visual information, a video image acquisition device (camera) is mounted on the work machine. A video image of a work site acquired by the video image acquisition device (camera) is displayed on a display device equipped in a remote operation device for the operator in the remote location. The operator operates the work machine by means of the remote operation device while checking the video image displayed on the display device.

For example, JP 2019-54464 A discloses a technique in which a video image acquisition device of a work machine captures an image of a work site, a virtual viewpoint image of the work machine that is viewed from a virtual viewpoint is created, and a real image captured by the video image acquisition device of the work machine and the virtual viewpoint image are displayed in different positions on the same screen of a display device.

CITATION LIST

Patent Literature

Patent Literature 1: JP 2019-54464 A

SUMMARY OF INVENTION

Technical Problem

In JP 2019-54464 A, a video image (real video image) of a work site from the video image acquisition device and a video image (virtual viewpoint video image) viewed from a virtual viewpoint are provided to an operator so that deterioration in the efficiency of the work remotely operated from a remote location can be expected to be suppressed. Here, the following problems occur.

Since video image transmission involves an enormous volume of communication data, a delay occurs depending on the state of the communication line. When a delay occurs in the video image transmission, a video image acquired from a video image acquisition device and a video image created from a virtual viewpoint behave differently even on the same screen. When the video images displayed on the same screen are inconsistent, it is difficult to suppress deterioration in the efficiency of the work of the operator and a risk of an accident.

The present invention has been made in view of the aforementioned problems and for the purpose of solving the problems, and an object of the present invention is to provide a remote operation device capable of remotely operating efficiently and safely a work machine that is operated from a remote location, even when a communication delay occurs.

Solution to Problem

To solve the aforementioned problems, a remote operation device of the present invention is a remote operation device including a control device that transmits an operation signal to a work machine to operate the work machine from a remote location, in which the control device includes a communication control section that receives a camera video image of a work site captured by a camera and vehicle body information of the work machine, a predicted trajectory computing section that computes a predicted trajectory of the work machine from the vehicle body information and outputs predicted trajectory data to be displayed as a video image on a display device, and a display control section that causes the display device to display the camera video image and the video image of the predicted trajectory on the same screen.

Advantageous Effects of Invention

The present invention allows an operator to recognize a current state of a vehicle body by displaying a video image of a predicted trajectory, even when a delay occurs in the video image transmission depending on the state of the communication line. Further, with a pseudo camera video image ((pseudo) predicted video image of the work machine as viewed from a camera that is created on the basis of the predicted trajectory) superposed, the difference from the real camera video image is distinctly revealed when a delay occurs in the communication line, and thus, the delay in the video image can be visually presented to the operator. Therefore, the work machine that is operated from a remote location can be remotely operated efficiently and safely, even when a communication delay occurs.

The problems, configurations, and effects other than those described above are clarified by the following description of embodiments.

DESCRIPTION OF EMBODIMENTS

Figure 1:
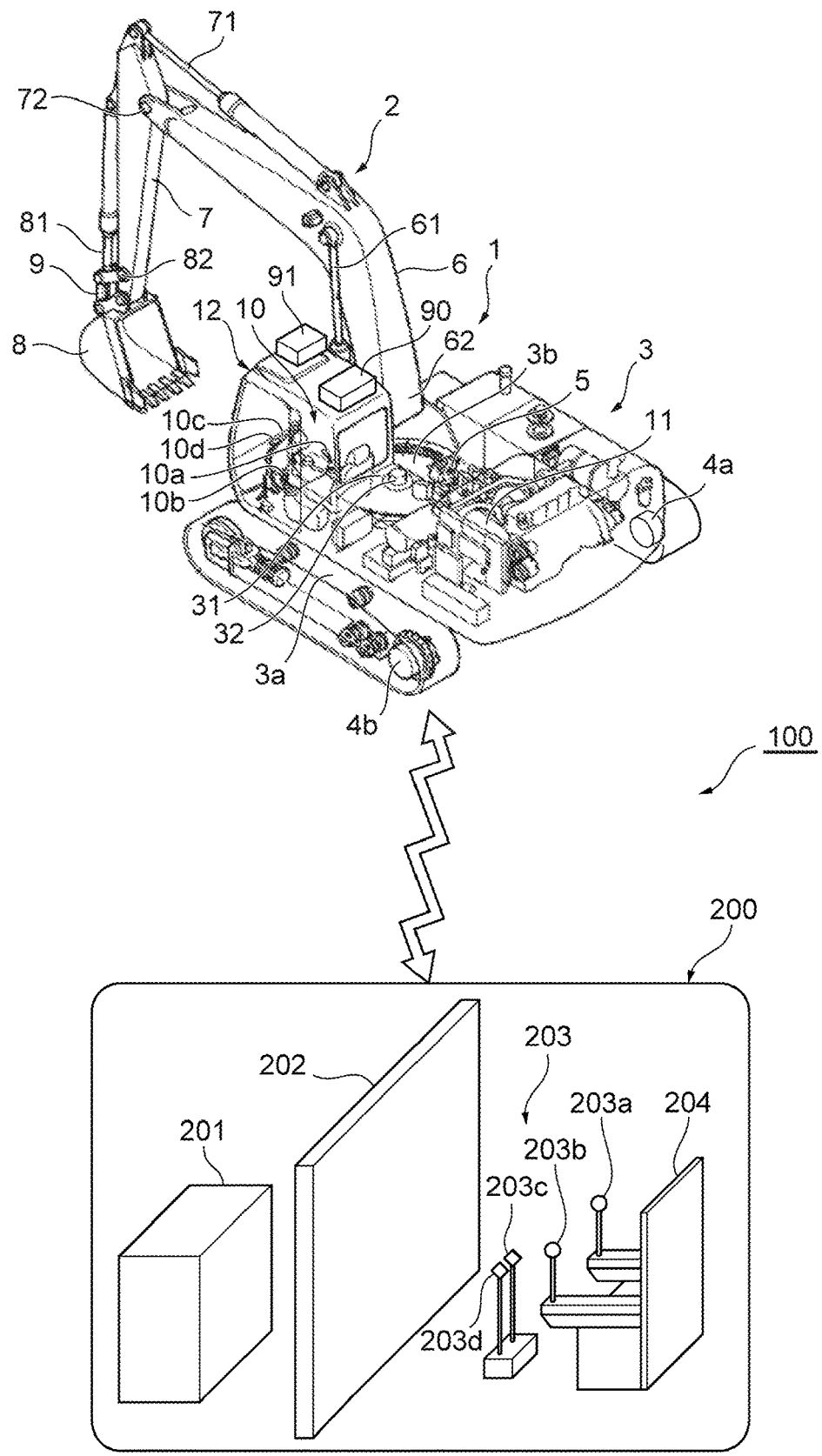
FIG. 1 is a view of the configuration of a remote operation system of a hydraulic shovel (work machine).

Hereinafter, embodiments of the present invention will be described using the drawings. In the drawings, portions having the same functions are assigned the same reference numerals and repeated descriptions are omitted in some cases. In the following description of the present specification, as a work machine to be remotely operated, a hydraulic shovel including a bucket 8 as a work tool at a tip end of a work device as in FIG. 1 is illustrated. Note that as long as an articulated work device configured with a plurality of coupled link members (an attachment, an arm, a boom, and the like) is included, application to a work machine other than a hydraulic shovel is also available.

Further, in the following description of the present specification, in the cases where there is a plurality of constituent elements that are the same, alphabets are attached to the ends of the reference numerals (numbers) in some cases, but the plurality of such constituent elements is collectively denoted without the alphabets in some cases. For example, one of traveling hydraulic motors 4a, 4b is present on each of the left and right sides, these are collectively denoted as a traveling hydraulic motor 4 in some cases.

First Embodiment

<Basic Configuration>

Figure 2:
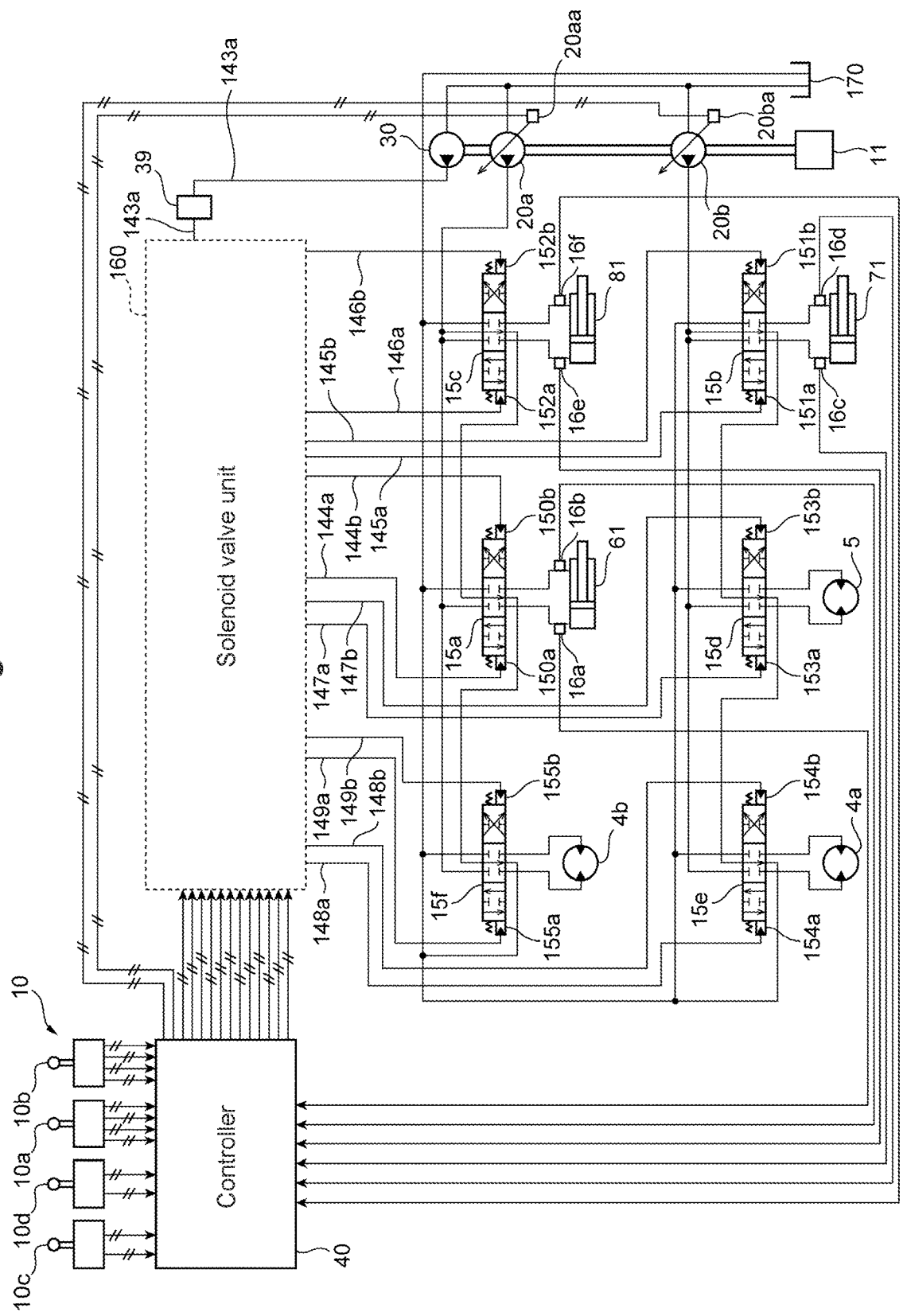
FIG. 2 is a diagram showing a controller of the hydraulic shovel (work machine), together with a hydraulic actuation device.
Figure 3:
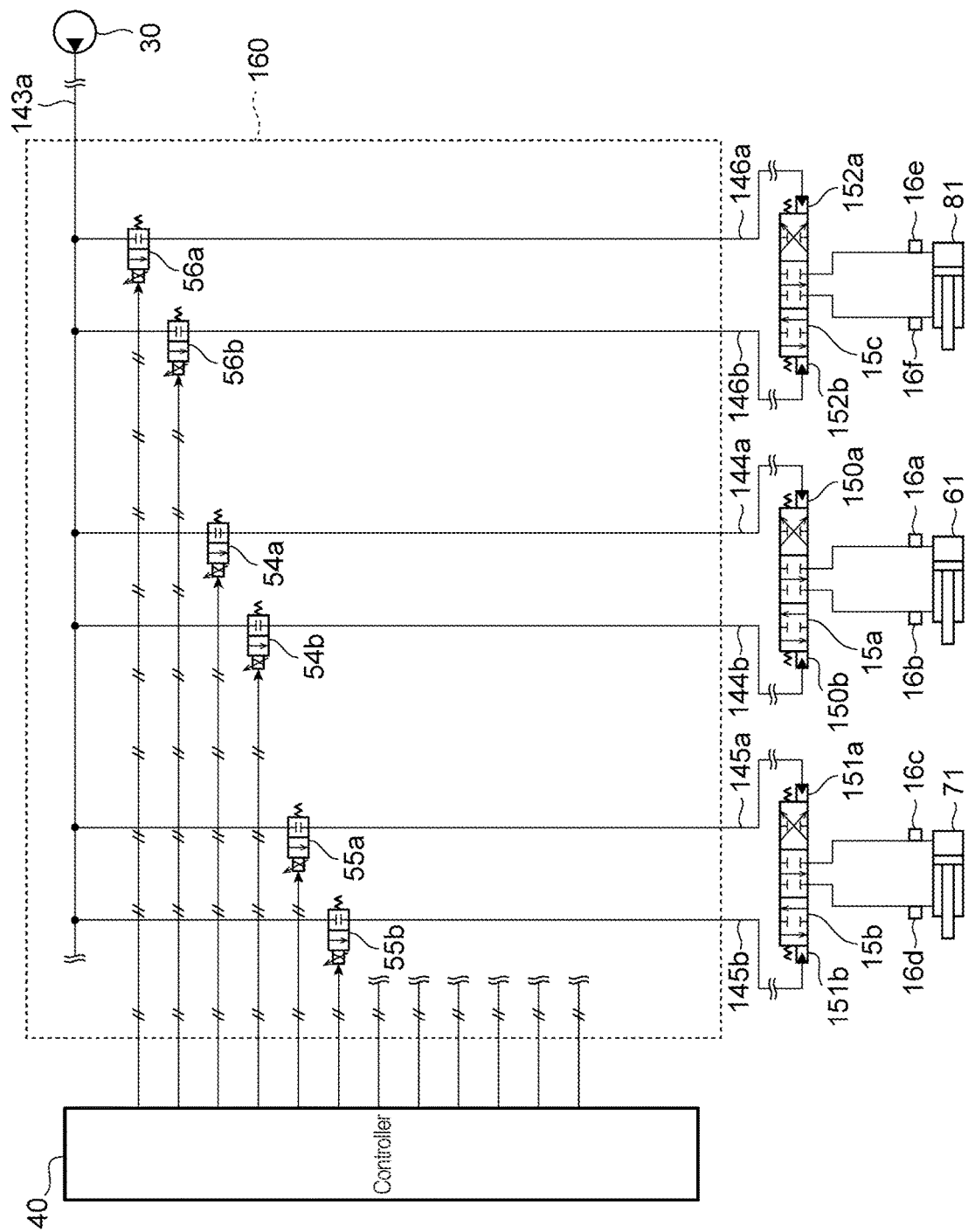
FIG. 3 is a detailed diagram of a solenoid valve unit.

FIG. 1 is a view showing an example of a remote operation system 100 of a work machine 1 according to a first embodiment of the present invention. The remote operation system 100 remotely operates the work machine 1. In the present embodiment, the work machine 1 is a hydraulic shovel. FIG. 2 is a diagram showing a controller of a hydraulic shovel (work machine) 1 according to the first embodiment of the present invention, together with a hydraulic actuation device, and FIG. 3 is a detailed diagram of a solenoid valve unit 160 in FIG. 2.

In FIG. 1, the hydraulic shovel 1 includes a work front 2 that is an articulated work device and a traveling body 3. The traveling body 3 includes a lower traveling part 3a that travels by means of left and right traveling hydraulic motors 4a, 4b (right traveling hydraulic motor 4a, left traveling hydraulic motor 4b) and an upper revolving part 3b that is attached on the lower traveling part 3a and that revolves by means of a revolving hydraulic motor 5. The work front 2 includes a plurality of driven members (a boom 6, an arm 7, and the bucket 8) coupled with each other that rotates in the vertical direction.

A base end of the boom 6 is rotatably supported in a front portion of the upper revolving part 3b via a boom pin. The arm 7 is rotatably coupled to a tip end of the boom 6 via an arm pin, and the bucket 8 is rotatably coupled to a tip end of the arm 7 via a bucket pin. The boom 6 is actuated by a boom cylinder 61, the arm 7 is actuated by an arm cylinder 71, and the bucket 8 is actuated by a bucket cylinder 81. In order to enable measurement of the rotation of the boom 6, the arm 7, and the bucket 8, a boom angle sensor 62, an arm angle sensor 72, and a bucket angle sensor 82 are attached to the boom pin, the arm pin, and a bucket link 9, respectively, and a vehicle body inclination angle sensor 31 that detects an inclination angle of the upper revolving part 3b relative to a reference surface (for example, a horizontal surface) is attached to the upper revolving part 3b. Note that the angle sensors 62, 72, 82 may be substituted by an angle sensor relative to a reference surface (for example, a horizontal surface). A revolving angle sensor 32 is attached to a revolving center shaft such that the relative angle between the upper revolving part 3b and the lower traveling part 3a can be measured. Inside an operating room 12 provided in the upper revolving part 3b, an operating device 10 for operating the hydraulic shovel 1 is disposed.

The operating device 10 includes a right operating lever 10a for operating the boom cylinder 61 (boom 6) and the bucket cylinder 81 (bucket 8), a left operating lever 10b for operating the arm cylinder 71 (arm 7) and the revolving hydraulic motor 5 (upper revolving part 3b), a right traveling lever 10c for operating the right traveling hydraulic motor 4a (lower traveling part 3a), and a left traveling lever 10d for operating the left traveling hydraulic motor 4b (lower traveling part 3a). Further, hereinafter, the right operating lever 10a, the left operating lever 10b, the right traveling lever 10c, and the left traveling lever 10d are collectively referred to as the operating device 10 in some cases.

An engine 11 that is a motor mounted on the upper revolving part 3b drives hydraulic pumps 20a, 20b and a pilot pump 30 as shown in FIG. 2. The hydraulic pumps 20a, 20b are variable displacement pumps in which the capacity is controlled by regulators 20aa, 20ba, and the pilot pump 30 is a fixed displacement pump. The hydraulic pump 20 and the pilot pump 30 suck an operating oil from a tank 170. In the present embodiment, a control signal output from a controller 40 that is a control device is input to the regulators 20aa, 20ba. Although the detailed configuration of the regulators 20aa, 20ba is omitted, the flow rate of ejection by the hydraulic pumps 20a, 20b is controlled in accordance with the control signal. A pump line 143a that is ejection piping of the pilot pump 30 passes a lock valve 39 and is then connected to solenoid proportional valves in the solenoid valve unit 160. In the present example, the lock valve 39 is a solenoid operated directional control valve and an electromagnetic drive unit thereof is electrically connected to a position detector of a gate lock lever disposed in the operating room 12 (FIG. 1). The position of the gate lock lever is detected by the position detector and the position detector inputs a signal corresponding to the position of the gate lock lever to the lock valve 39. When the gate lock lever is in a lock position, the lock valve 39 closes to shut off the pump line 143a, and when the gate lock lever is in a lock release position, the lock valve 39 opens to open the pump line 143a. That is, in the state in which the pump line 143a is shut off, the operation by the operating device 10 is disabled, thereby prohibiting the operations of travelling, revolving, excavation, and the like. The operating device 10 (10a, 10b, 10c, 10d) is an electric lever and generates an electric signal corresponding to the amount and direction of the operation by the operator. The electric signal generated as such is input to the controller 40 and the controller 40 outputs the electric signal to the solenoid valve unit 160 to drive solenoid proportional valves 54 to 59 (see FIG. 3; 57 to 59 are not shown) corresponding to the operation input to the operating device 10. The electric signal is input to hydraulic drive units 150a to 155b via pilot lines 144a to 149b. A pressure oil ejected from the hydraulic pump 20 is supplied to the boom cylinder 61, the arm cylinder 71, the bucket cylinder 81, the revolving hydraulic motor 5, the right traveling hydraulic motor 4a, and the left traveling hydraulic motor 4b, which are actuators, via flow rate control valves 15a, 15b, 15c, 15d, 15e, 15f (see FIG. 2 or FIG. 3; 15*d*, 15*e*, 15*f* are not shown in FIG. 3) that operate in accordance with the electric signals input to the hydraulic drive units 150*a* to 155*b*. The boom cylinder 61, the arm cylinder 71, and the bucket cylinder 81 expand and contract with the pressure oil supplied, so that the boom 6, the arm 7, and the bucket 8 each rotate to thus change the position and posture of the bucket 8. Further, the revolving hydraulic motor 5 rotates with the pressure oil supplied, so that the upper revolving part 3*b* revolves relative to the lower traveling part 3*a*. Then, the right traveling hydraulic motor 4*a* and the left traveling hydraulic motor 4*b* rotate with the pressure oil supplied, so that the lower traveling part 3*a* travels.

The boom cylinder 61, the arm cylinder 71, and the bucket cylinder 81 are provided with load detection devices 16*a* to 16*f* to enable detection of the cylinder pressure. In the present embodiment, the load detection device 16 is a pressure sensor and detects the pressure on the bottom side and the pressure on the rod side of each of the boom cylinder 61, the arm cylinder 71, and the bucket cylinder 81 and outputs the pressures to the controller 40 as electric signals.

As shown in FIG. 1, a vehicle-mounted camera 91 as a video image acquisition device is mounted on the upper revolving part 3*b*. When the hydraulic shovel 1 is operated from a remote location (remote operation), the vehicle-mounted camera 91 acquires a camera video image of a work site captured (video image of the work site) for the purpose of providing the visual information to the operator who operates from the remote location (which will be described later). Note that in the present example, the camera as the video image acquisition device that captures the image of the work site is mounted on the hydraulic shovel 1 (upper revolving part 3*b* thereof), but the camera video image of the work site captured (video image of the work site) may be acquired by a camera disposed on the work site, for example.

Further, a communication device 90 is mounted on the upper revolving part 3*b*. The communication device 90 communicatively connects the hydraulic shovel 1 and a remote operation device 200 via a network. The remote operation device 200 is disposed in a remote location away from the work site so as to operate the hydraulic shovel 1 from the remote location (remote operation). The communication device 90 transmits, to the remote operation device 200, the camera video image from the vehicle-mounted camera 91 and the vehicle body information from the sensors (angle sensors 62, 72, 82, 32 and the load detection devices 16*a* to 16*f*), and receives control signals (including an operation signal of the operating device 10 of the hydraulic shovel 1) from the remote operation device 200 and transmits the control signals to the operating device 10.

The remote operation device 200 includes a remote operation control device (control device) 201 including electric equipment communicating with the hydraulic shovel 1 and having processing functions, a display device 202 that displays a video image, a right operating lever 203*a* for operating the boom cylinder 61 (boom 6) and the bucket cylinder 81 (bucket 8), a left operating lever 203*b* for operating the arm cylinder 71 (arm 7) and the revolving hydraulic motor 5 (upper revolving part 3*b*), a right traveling lever 203*c* for operating the right traveling hydraulic motor 4*a* (lower traveling part 3*a*), a left traveling lever 203*d* for operating the left traveling hydraulic motor 4*b* (lower traveling part 3*a*), and an operating seat 204. Further, hereinafter, the right operating lever 203*a*, the left operating lever 203*b*, the right traveling lever 203*c*, and the left traveling lever 203*d* are collectively referred to as a remotely operating device 203 in some cases. The remotely operating device 203 inputs an operation signal (for example, an electric signal corresponding to the amount and direction of the operation by the operator) to the remote operation control device 201 and the remote operation control device 201 transmits, via a network, a control signal (including an operation signal of the operating device 10 of the hydraulic shovel 1) to the communication device 90 mounted on the hydraulic shovel 1, so as to remotely operate the hydraulic shovel 1. The display device 202 displays a superposed video image from the remote operation control device 201 so as to provide visual information to the operator who performs the remote operation (which will be described later).

<Solenoid Valve Unit (Hydraulic Unit for Front Control) 160>

As shown in FIG. 3, the solenoid valve unit (only a portion of the hydraulic unit for front control is displayed in FIG. 3) 160 is connected, on a primary port side thereof, to the pilot pump 30 via the pump line 143*a* and includes solenoid proportional valves 54*a* to 56*b* that depressurize a pilot pressure from the pilot pump 30 and output the pilot pressure to the pilot lines 144*a* to 146*b*, and solenoid proportional valves 57*a* to 59*b* that similarly depressurize the pilot pressure from the pilot pump 30 and output the pilot pressure to the pilot lines 147*a* to 149*b*, which are not shown due to restriction in the drawing space in FIG. 3 (see also FIG. 2).

When the power is not supplied, the opening of each of the solenoid proportional valves 54*a* to 59*b* is minimum and as the current as the control signal from the controller 40 increases, the opening increases. In this manner, the opening of each of the solenoid proportional valves 54*a* to 59*b* corresponds to the control signal from the controller 40.

In the solenoid valve unit 160 configured as described above, when a control signal is output from the controller 40 to drive the solenoid proportional valves 54*a* to 59*b*, the pilot pressure can be generated even when there is no corresponding operation of the operating device 10 by the operator, and thus, the operation of each actuator (4, 5, 61, 71, 81) can be forcibly generated.

<Remote Operation Control Device 201>

Figure 4:
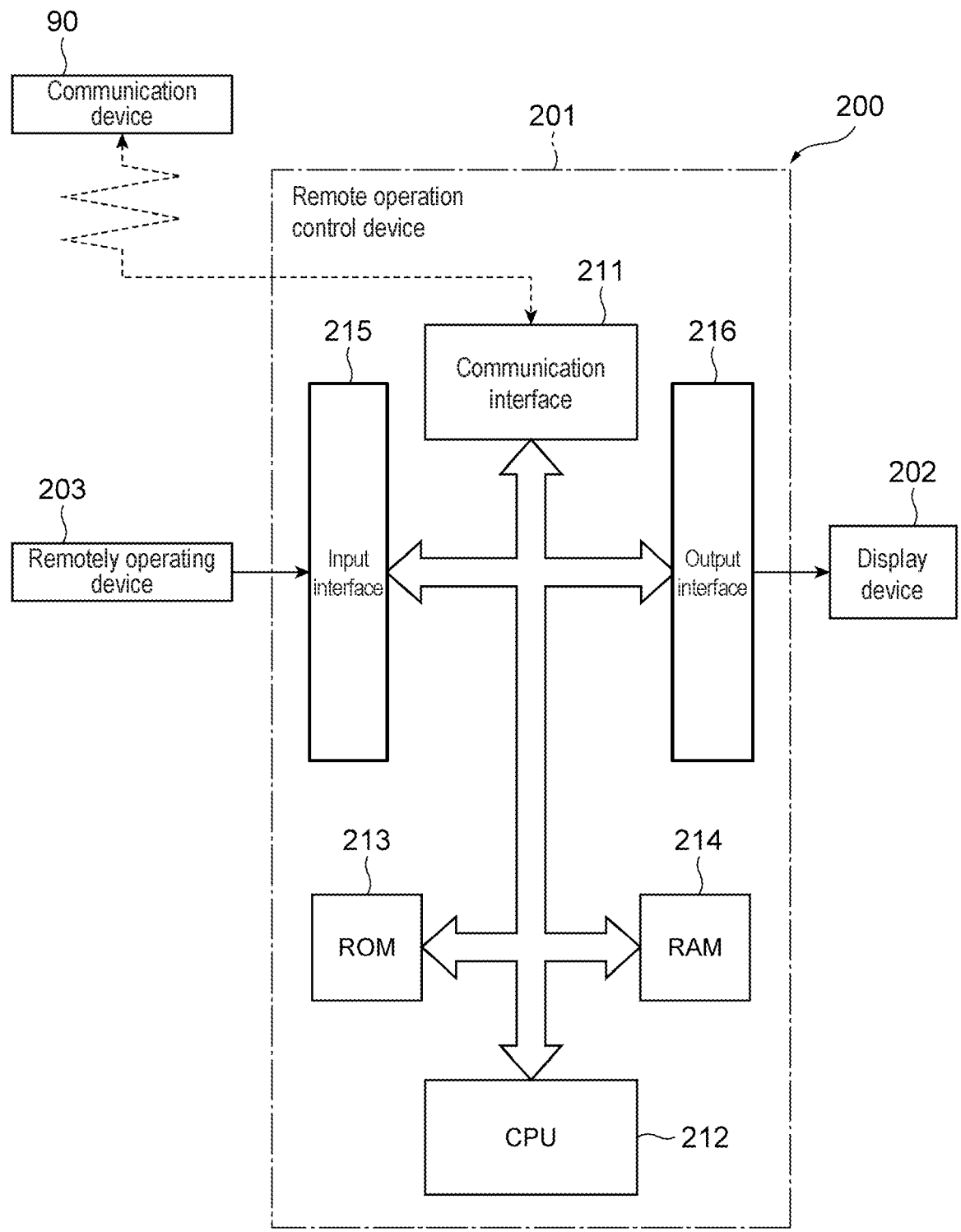
FIG. 4 is a diagram of a hardware configuration of a remote operation control device of a remote operation device shown in FIG. 1.

FIG. 4 is a diagram of a hardware configuration that the remote operation control device 201 of the remote operation device 200 according to the present embodiment includes. In FIG. 4, the remote operation control device 201 includes a communication interface 211, a central processing unit (CPU) 212 as a processor, a read only memory (ROM) 213 and a random access memory (RAM) 214 as memory devices, an input interface 215, and an output interface 216.

The communication interface 211 transmits/receives a signal to/from the communication device 90 mounted on the hydraulic shovel 1. The video image by the vehicle-mounted camera and the vehicle body information of the hydraulic shovel 1 are received from the communication device 90 and are input to the CPU 212. Further, the control signal from the remotely operating device 203 is transmitted to the communication device 90. The CPU 212 performs predetermined computing processing on the signals taken in from the communication interface 211, the ROM 213, and the RAM 214, on the basis of the control programs stored in the ROM 213. The ROM 213 is a recording medium in which the control programs for executing the control content including the processing related to the flowchart described later, and various pieces of information necessary for executing the processing in the flowchart are stored.

The input interface 215 receives the control signal from the remotely operating device 203 as an input signal and outputs the signal to the communication interface 211.

The output interface 216 creates a signal for output corresponding to the result of computation by the CPU 212 and displays the signal on the screen of the display device 202.

Figure 5:
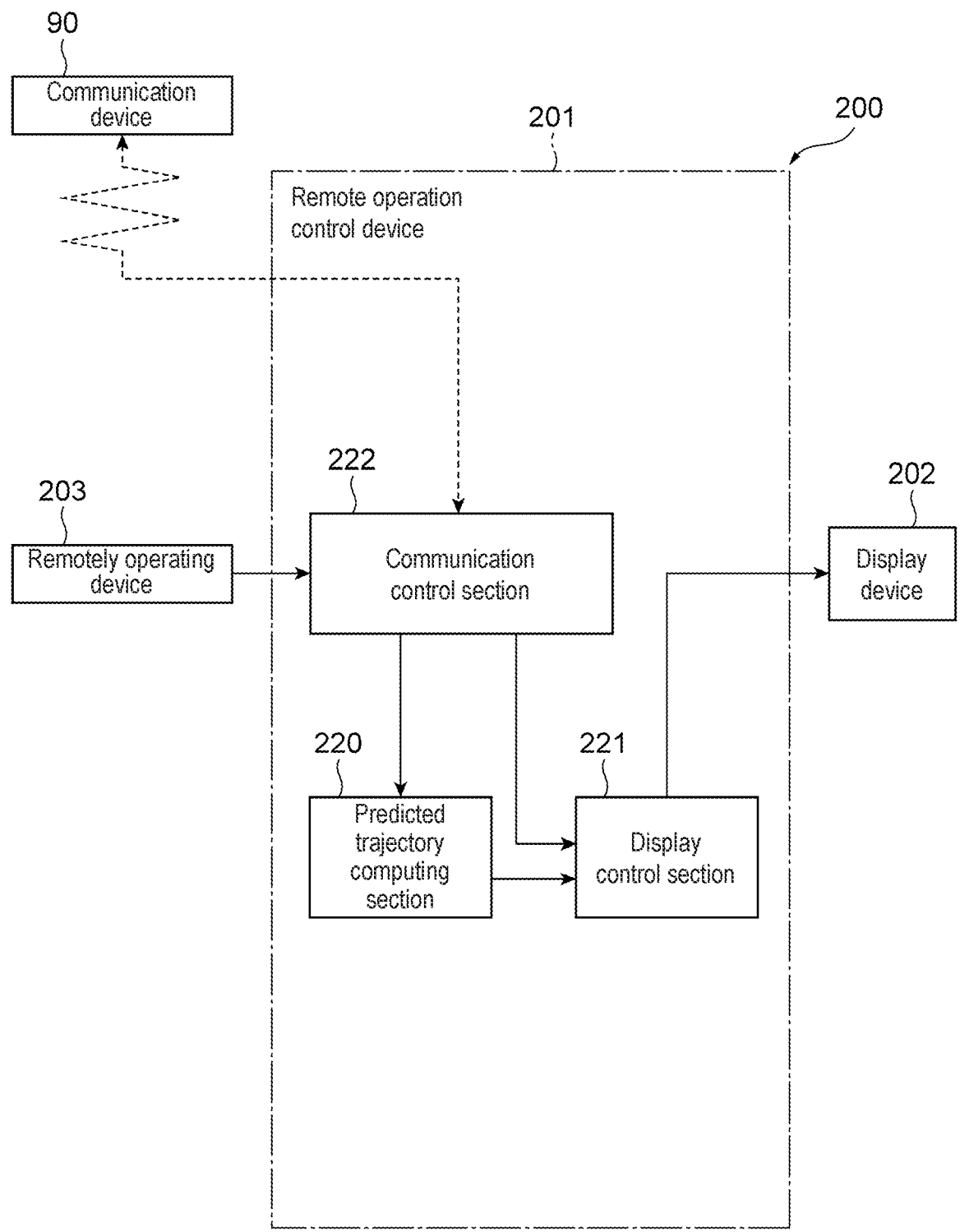
FIG. 5 is a functional block diagram of the remote operation control device of the remote operation device of a first embodiment of FIG. 1.

FIG. 5 is a functional block diagram of the remote operation control device 201 of the remote operation device 200 according to the present embodiment.

In FIG. 5, the remote operation control device 201 includes a predicted trajectory computing section 220, a display control section 221, and a communication control section 222.

The predicted trajectory computing section 220 computes a predicted trajectory of the hydraulic shovel 1 from the vehicle body information input from the communication interface 211 (FIG. 4) and outputs the predicted trajectory data. For example, in accordance with the sensor value of each site transmitted from the communication device 90 mounted on the hydraulic shovel 1, a video image signal (corresponding to the predicted trajectory data) for drawing the posture of the hydraulic shovel 1 one second ahead is output to the display control section 221.

The display control section 221 superposes the computation result of computing the predicted trajectory by the predicted trajectory computing section 220 of the remote operation control device 201 and the video image by the vehicle-mounted camera of the hydraulic shovel 1 that is input from the communication interface 211 (FIG. 4). The superposed video image signal is output to the display device 202.

The communication control section 222 packetizes the signal to be transmitted and transmits the signal to the communication device 90 of the hydraulic shovel 1. Further, the packet signal from the communication device 90 is decoded so as to be read by the predicted trajectory computing section 220 and the display control section 221.

<Computing Flow of Predicted Trajectory Computing Section 220>

Figure 6:
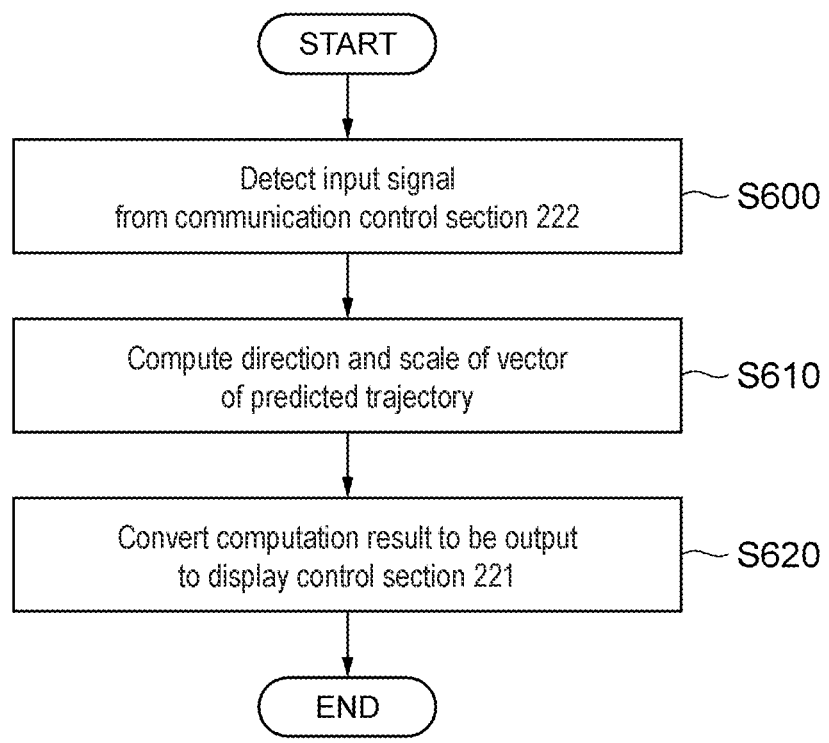
FIG. 6 is a flowchart of computing processing of a predicted trajectory computing section of the first embodiment.

A computing flow performed by the predicted trajectory computing section 220 of the remote operation control device 201 of the present embodiment is shown in FIG. 6. This control flow is performed with the input of the signal from the communication device 90 through the communication control section 222 that is shown in FIG. 5.

In S600, the input signal from the communication control section 222 is detected, and the process proceeds to S610.

In S610, predicted trajectories of the boom 6, the arm 7, the bucket 8, and the upper revolving part 3b are computed from the input signal detected in S600. In the present embodiment, the direction and scale of the vector for each time after predetermined seconds from the current time are each computed on the basis of the position, the speed, and the acceleration of the boom 6, the arm 7, the bucket 8, and the upper revolving part 3b that are stored in the vehicle body information. Upon completion of the computation, the process proceeds to S620.

In S620, the direction and scale of the vector that are the computation results are converted into an interface corresponding to the processing in the display control section 221. However, if unnecessary, the conversion is not performed. In the present embodiment, the direction and scale of the vector are converted into point group data. The computation results obtained by adjusting the interface are output to the display control section 221 and the processing ends.

<Control Flow of Display Control Section 221>

Figure 7:
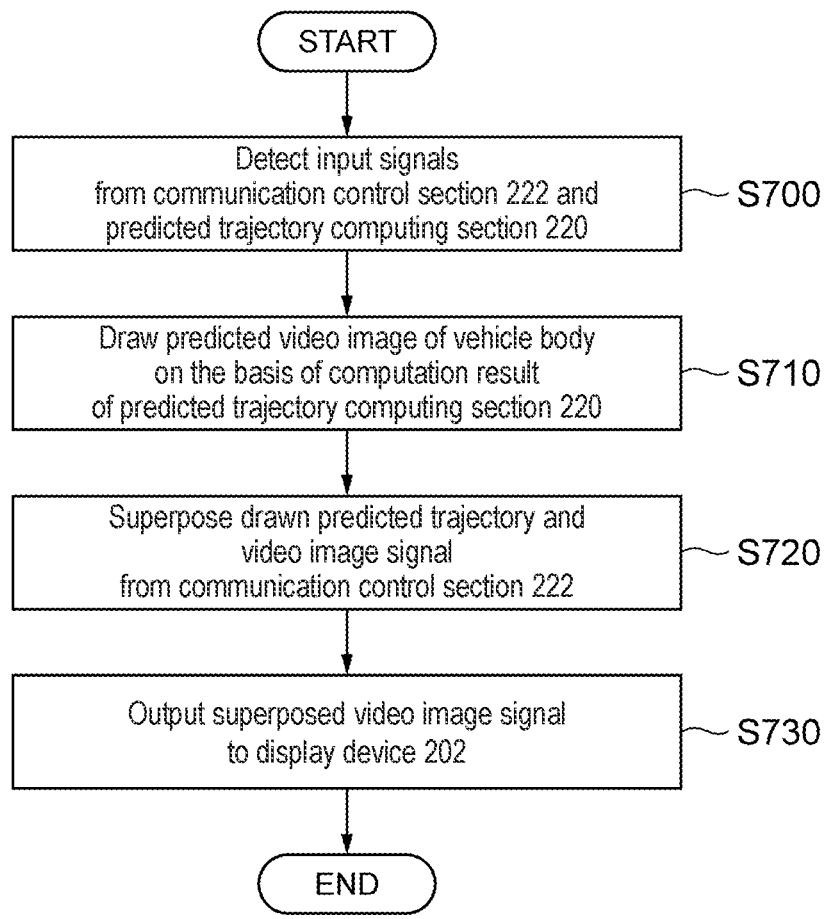
FIG. 7 is a flowchart of control processing of a display control section of the first embodiment.

A control flow performed by the display control section 221 of the remote operation control device 201 of the present embodiment is shown in FIG. 7. This control flow is performed with the input of the signal from the communication device 90 through the communication control section 222 that is shown in FIG. 5 and with the input of the computation result from the predicted trajectory computing section 220.

In S700, the input signals from the communication control section 222 and the predicted trajectory computing section 220 are detected and the process proceeds to S710.

In S710, a predicted trajectory is drawn as a video image signal on the basis of the computation result of the predicted trajectory computing section 220 that is detected in S700. In the present embodiment, as the predicted trajectory, a predicted video image of the vehicle body (pseudo predicted video image data of the hydraulic shovel 1 that is created on the basis of the computation result (predicted trajectory) of the predicted trajectory computing section 220 as viewed from the camera (viewpoint of the camera), which is also referred to as a pseudo camera video image in the present specification) and symbols indicating the direction and scale of the vector that are gradated as each second elapses are drawn. Upon completion of the drawing, the process proceeds to S720.

In S720, the predicted trajectory (video image signal: pseudo camera video image) drawn in S710 and the video image signal (that is, the real video image by the vehicle-mounted camera of the hydraulic shovel 1) from the communication control section 222 that is detected in S700 are superposed, and the process proceeds to S730.

Figure 13:
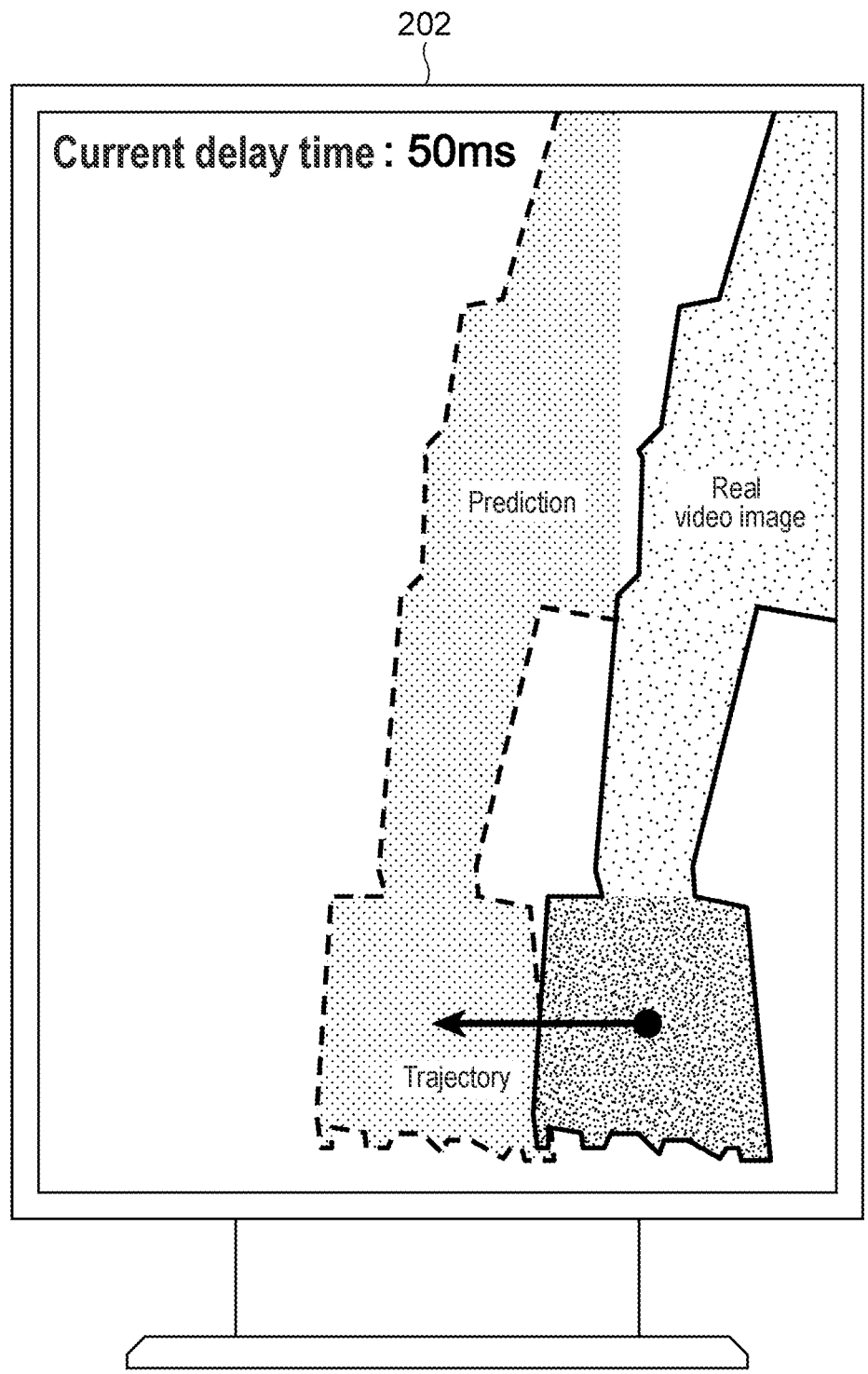
FIG. 13 is a view showing a display example (superposed video images) on a display screen of a display device.

In S730, the video image signals superposed in S720 are output to the display device 202 and the processing ends. In the display device 202, the predicted trajectory (pseudo camera video image) and the video image by the vehicle-mounted camera (real video image of the work site captured) of the hydraulic shovel 1 are superposed and displayed on the same screen (simultaneously) on the basis of the video image signal sent from the display control section 221 (see FIG. 13).

<Control Flow of Communication Control Section 222>

Figure 8:
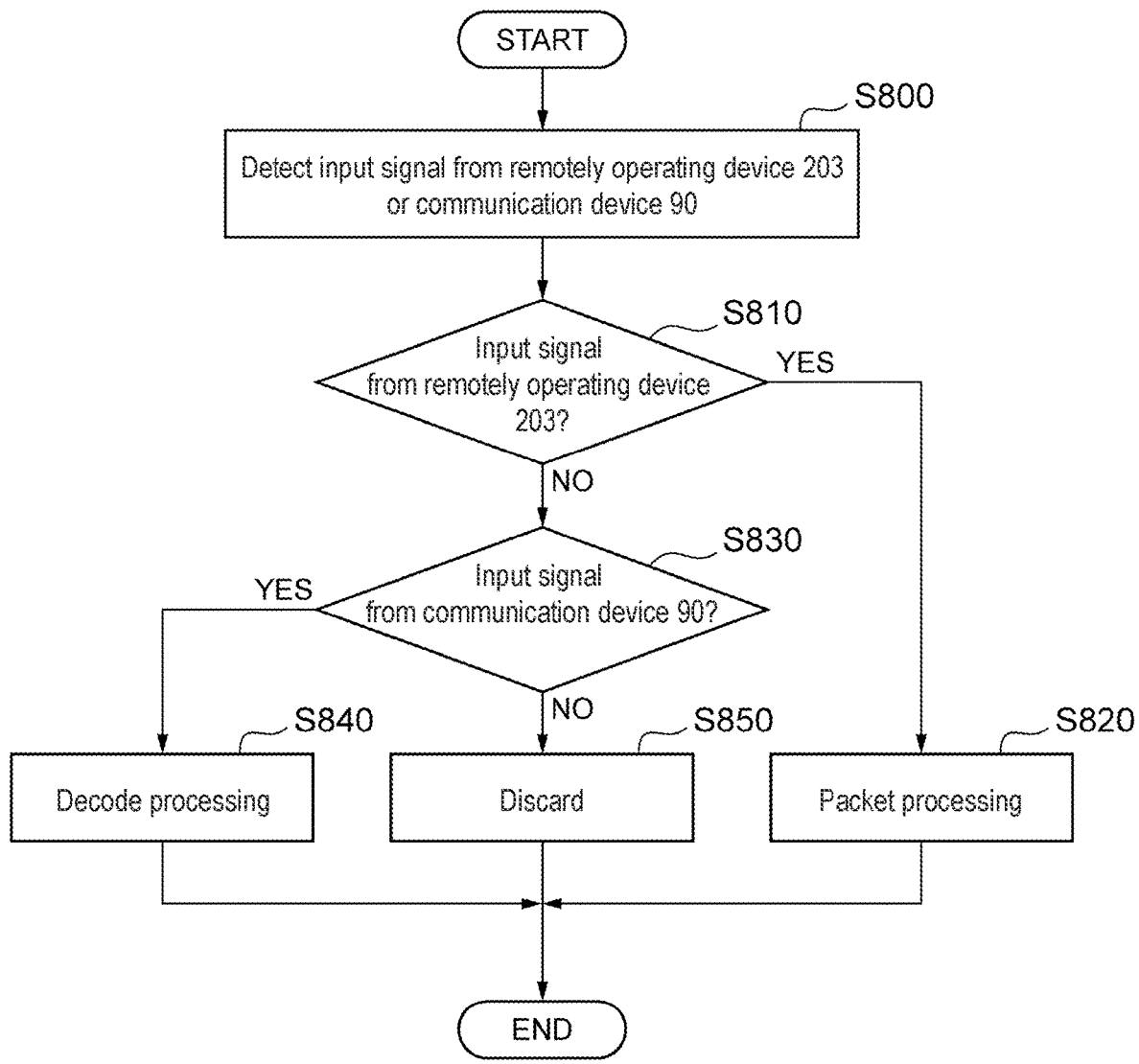
FIG. 8 is a flowchart of control processing of a communication control section of the first embodiment.

A control flow performed by the communication control section 222 of the remote operation control device 201 of the present embodiment is shown in FIG. 8. This control flow is performed with the input of the signal from the remotely operating device 203 or the communication device 90 that is shown in FIG. 5.

In S800, the input signal (received signal) from the remotely operating device 203 or the communication device 90 is detected, and the process proceeds to S810.

In S810, when the input signal detected in S800 is the input signal from the remotely operating device 203, the process proceeds to S820. If not, the process proceeds to S830.

In S820, the input signal is packetized and transmitted to the communication device 90, and the processing ends.

In S830, when the input signal detected in S800 is the input signal from the communication device 90, the process proceeds to S840. If not, the process proceeds to S850.

In S840, the input signal is decoded so as to be read by the predicted trajectory computing section 220 and the display control section 221 and is output, and the processing ends.

In S850, since none of the processing conditions applies, the input signal is discarded and the processing ends.

<Operation and Effects>

As described above, the control device (remote operation control device) 201 of the remote operation device 200 of the present embodiment includes the communication control section 222 that receives the camera video image of the work site captured by the vehicle-mounted camera 91 and the vehicle body information of the work machine (hydraulic shovel) 1, the predicted trajectory computing section 220 that computes the predicted trajectory of the work machine (hydraulic shovel) 1 from the vehicle body information and outputs the predicted trajectory data to be displayed on the display device 202 as a video image, and the display control section 221 that causes the display device 202 to display the camera video image and the video image of the predicted trajectory on the same screen (simultaneously).

Further, the display control section 221 causes the display device 202 to superpose and display the camera video image and the video image of the predicted trajectory on the same screen.

Furthermore, the display control section 221 creates, on the basis of the predicted trajectory, a pseudo camera video image that is a (pseudo) predicted video image of the work machine (hydraulic shovel) 1 as viewed from the vehicle-mounted camera 91 and causes the display device 202 to superpose and display the camera video image and the pseudo camera video image on the same screen.

That is, the remote operation device 200 of the present embodiment superposes the video image by the vehicle-mounted camera and the video image of the predicted trajectory to be displayed to the operator in a remote location, so that the state of the vehicle body is transmitted to the operator irrespective of a delay in the video image data, and the delay in the video image is visually presented to the operator.

In the remote operation system 100 including the remote operation device 200 configured as described above, even when a delay in the video image transmission occurs depending on the state of the communication line, the video image of the predicted trajectory is displayed so that the operator can recognize the current state of the vehicle body. Further, with the pseudo camera video image ((pseudo) predicted video image of the hydraulic shovel 1 as viewed from the camera that is created on the basis of the predicted trajectory) superposed, the difference from the real camera video image is distinctly revealed when a delay occurs in the communication line, and thus, the delay in the video image can be visually presented to the operator. Therefore, the work machine (hydraulic shovel) 1 that is operated from a remote location can be remotely operated efficiently and safely, even when a communication delay occurs.

Second Embodiment

Figure 9:
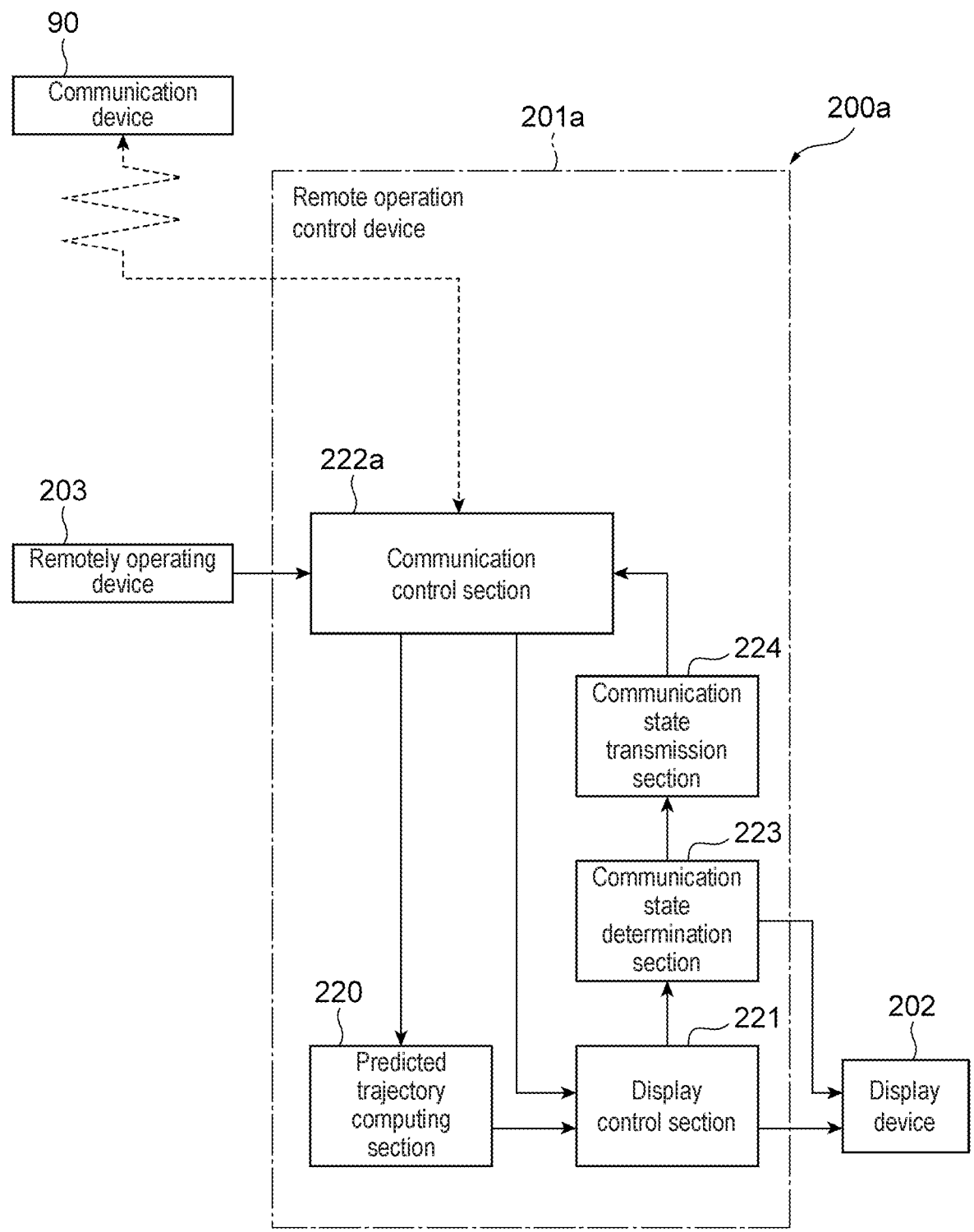
FIG. 9 is a functional block diagram of a remote operation control device of a remote operation device of a second embodiment.

A second embodiment of the present invention will be described using FIGS. 9 to 12. FIG. 9 is a functional block diagram of a remote operation control device 201a of a remote operation device 200a according to the present embodiment.

In addition to the configuration of the first embodiment, the remote operation control device 201a of the remote operation device 200a of the present second embodiment additionally includes a communication state determination section 223 and a communication state transmission section 224 as shown in FIG. 9 and is configured such that the video image signals superposed in the display control section 221 are input to the communication state determination section 223.

<Remote Operation Control Device 201a>

The communication state determination section 223 determines the transmission state of the communication line between the hydraulic shovel 1 and the remote operation device 200a from the difference between the predicted trajectory (pseudo camera video image) of the video image signal input from the display control section 221 and the video image by the vehicle-mounted camera. The determination result is output to the communication state transmission section 224 and the display device 202.

The communication state transmission section 224 transmits, via a communication control section 222a, the determination result (determination result of the transmission state of the communication line) of the communication state determination section 223 to the communication device 90 of the hydraulic shovel 1.

<Computing Flow of Communication State Determination Section 223>

Figure 10:
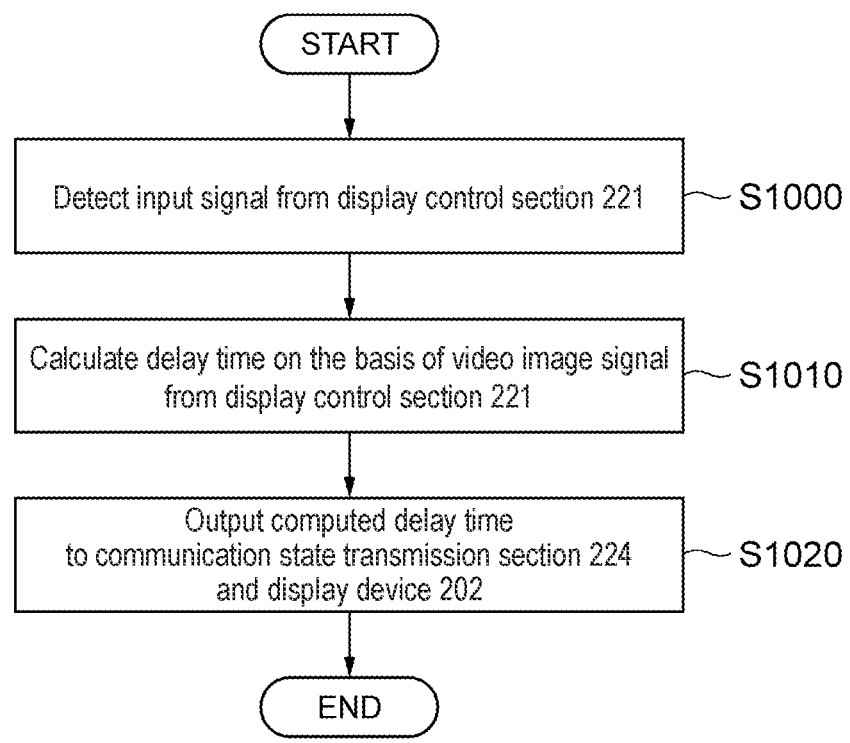
FIG. 10 is a flowchart of computing processing of a communication state determination section of the second embodiment.

FIG. 10 shows a flowchart of a control by the communication state determination section 223 of the remote operation control device 201a of the present second embodiment. This control flow is performed with the input of the output from the display control section 221 shown in FIG. 9.

In S1000, the input signal from the display control section 221 is detected and the process proceeds to S1010.

In S1010, the communication state is determined on the basis of the input signal from the display control section 221 that is detected in S1000. In the present embodiment, the delay time is calculated, on the basis of a delay computing table, from the distribution of the difference amount of characteristic points between the real camera video image and the pseudo camera video image in the superposed video image. Upon completion of the calculation of the delay time in the communication line, the process proceeds to S1020.

In S1020, the delay time computed in S1010 is output to the communication state transmission section 224 and the display device 202, and the processing ends. In the display device 202, the delay time that is the determination result transmitted from the communication state determination section 223 is displayed on the same screen, together with the predicted trajectory (pseudo camera video image) or the video image by the vehicle-mounted camera (the real video image of the work site captured) of the hydraulic shovel 1 (see FIG. 13).

<Control Flow of Communication State Transmission Section 224>

Figure 11:
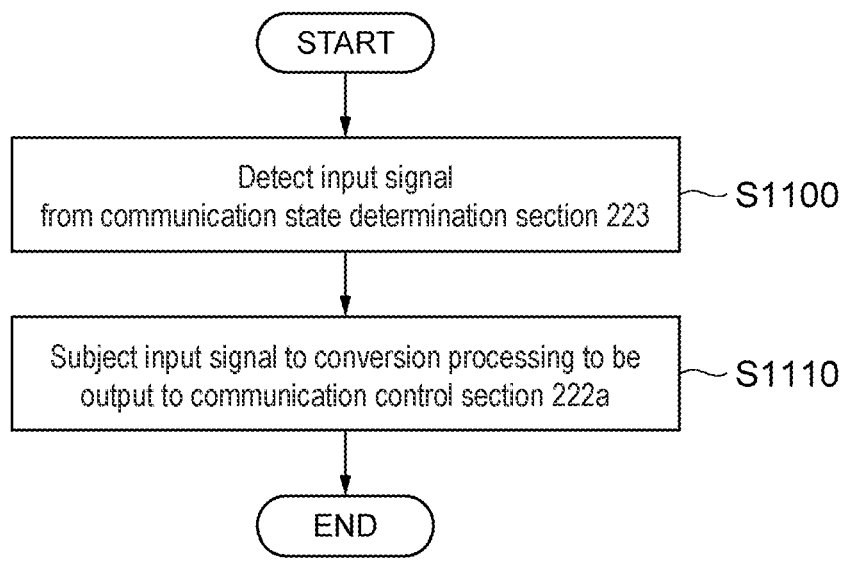
FIG. 11 is a flowchart of control processing of a communication state transmission section of the second embodiment.

FIG. 11 shows a flowchart of a control by the communication state transmission section 224 of the remote operation control device 201a of the present second embodiment. This control flow is performed with the input of the output from the communication state determination section 223 shown in FIG. 9.

In S1100, the input signal from the communication state determination section 223 is detected and the process proceeds to S1110.

In S1110, the input signal from the communication state determination section 223 detected in Si 100 is output to the communication control section 222a. In the present embodiment, the input signal is subjected to conversion processing as one of the operation signals of the remotely operating device 203 and is output to the communication control section 222a. Upon output of the input signal to the communication control section 222a, the processing ends.

<Control Flow of Communication Control Section 222a>

Figure 12:
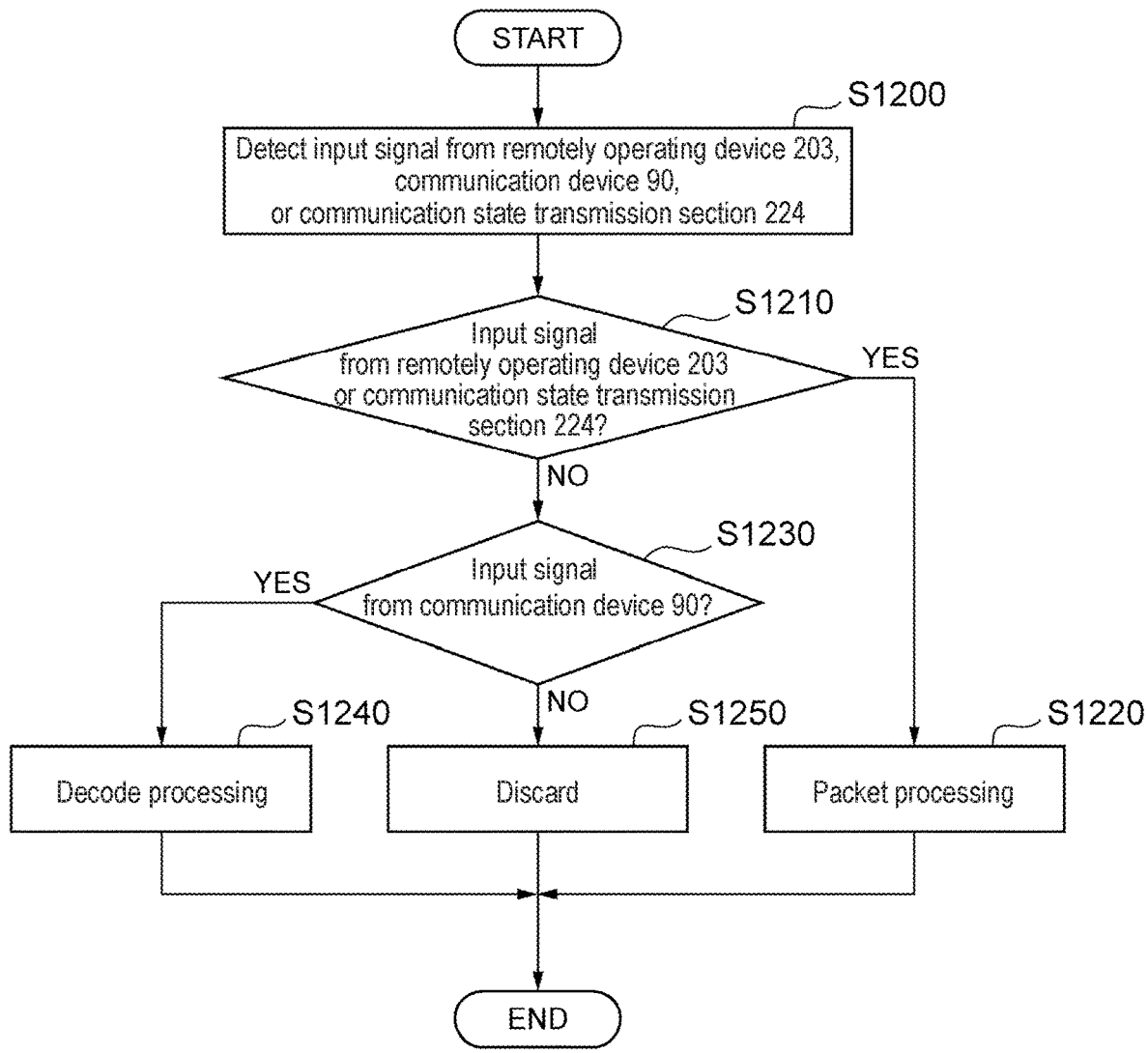
FIG. 12 is a flowchart of control processing of a communication control section of the second embodiment.

A flow of a control performed by the communication control section 222a of the remote operation control device 201a in the present second embodiment is shown in FIG. 12.

This control flow is performed with the input of the signal from the remotely operating device 203, the communication device 90, or the communication state transmission section 224 shown in FIG. 9.

In S1200, the input signal (received signal) from the remotely operating device 203, the communication device 90, or the communication state transmission section 224 is detected, and the process proceeds to S1210.

In S1210, when the input signal detected in S1200 is the input signal from the remotely operating device 203 or the communication state transmission section 224, the process proceeds to S1220. If not, the process proceeds to S1230.

In S1220, the input signal is packetized and transmitted to the communication device 90, and the processing ends.

In S1230, when the input signal detected in S1200 is the input signal from the communication device 90, the process proceeds to S1240. If not, the process proceeds to S1250.

In S1240, the input signal is decoded so as to be read by the predicted trajectory computing section 220 and the display control section 221 and is output, and the processing ends.

In S1250, since none of the processing conditions applies, the input signal is discarded and the processing ends.

<Operation of Hydraulic Shovel (Work Machine) 1>

The hydraulic shovel (work machine) 1 of the present embodiment restricts the operation of the vehicle body in accordance with the determination result of the communication state determination section 223 that is received from the communication state transmission section 224. For example, the hydraulic shovel 1 includes a table of upper limit values for the operation speed for the delay time that is the determination result of the communication state determination section 223, and as the delay time of the determination result of the communication state determination section 223 increases, the upper limit value for the operation speed is restricted to delay the operation. Alternatively, when the communication state determination section 223 determines an interruption in the communication, the hydraulic shovel 1 stops all the drive units.

Note that in the present example, the communication state transmission section 224 transmits, to the communication device 90 of the hydraulic shovel 1, the determination result (delay time) of the communication state determination section 223 as it is, but for example, only when the delay time computed by the communication state determination section 223 is greater than a predetermined threshold and a communication failure is determined, the determination result (delay time) of the communication state determination section 223 may be transmitted to the communication device 90 of the hydraulic shovel 1.

<Operation and Effects>

As described above, the remote operation device 200a of the present embodiment further includes the communication state determination section 223 that determines the transmission state of the communication line between the work machine (hydraulic shovel) 1 and the remote operation device 200 on the basis of the difference between the camera video image and the pseudo camera video image.

Further, the communication state determination section 223 causes the display device 202 to display the determination result of the transmission state of the communication line.

Furthermore, the communication state transmission section 224 is further included that transmits the determination result of the transmission state of the communication line to the work machine (hydraulic shovel) 1 (for example, when the communication state determination section 223 determines that a communication failure has occurred).

In the remote operation system 100 including the remote operation device 200a configured as described above and the hydraulic shovel 1, two video images are overlapped to thus be capable of visually notifying the operator of the delay state as in the first embodiment, as well as obtaining the delay time that is the delay determination result. Further, since the delay determination result can be transmitted to the hydraulic shovel 1, the hydraulic shovel 1 can be controlled in accordance with the delay determination result.

Figure 14:
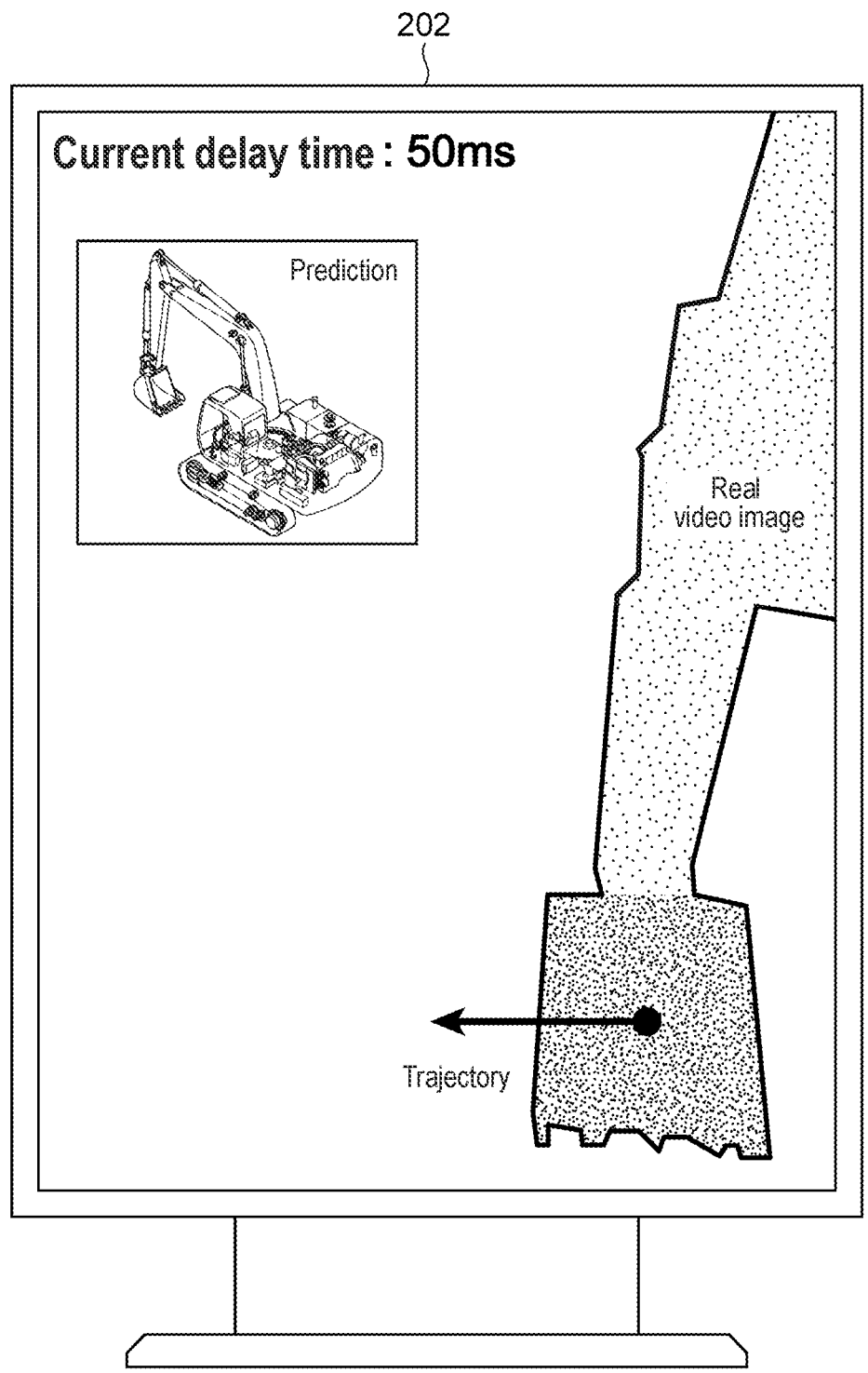
FIG. 14 is a view showing a display example (video images displayed in different positions without being superposed) on the display screen of the display device.

Note that in the aforementioned embodiments, in the display device 202, the predicted trajectory (pseudo camera video image) and the video image by the vehicle-mounted camera (real video image of the work site captured) of the hydraulic shovel 1 are superposed and displayed on the same screen (simultaneously) (see FIG. 13), but for example, as shown in FIG. 14, the predicted trajectory (pseudo camera video image) and the video image by the vehicle-mounted camera (real video image of the work site captured) of the hydraulic shovel 1 may be displayed in different positions on the same screen (see FIG. 14).

Note that the present invention is not limited to the aforementioned embodiments, but encompasses various modified embodiments. For example, the aforementioned embodiments are provided for detailed description to facilitate understanding of the present invention and do not necessarily include all the described configurations. Further, a part of the configuration of one embodiment can be replaced with the configuration of another embodiment, and the configuration of one embodiment can also be added to the configuration of another embodiment. Furthermore, for a part of the configuration of each embodiment, addition and deletion of and replacement with another configuration are available.

Further, the functions of the controller of the above-described embodiments may be partially or entirely embodied with hardware by designing with an integrated circuit, for example. Furthermore, the functions may be embodied with software by allowing the processor to interpret and execute the programs to realize the functions. The information of the programs, tables, files, and the like to embody the functions may be stored in a recording device such as a hard disk and a SSD (Solid State Drive) or a recording medium such as an IC card, a SD card, and a DVD, as well as the memory device in the controller.

REFERENCE SIGNS LIST 1 hydraulic shovel (work machine)
2 work front (work device)
3 traveling body
4 traveling hydraulic motor
5 revolving hydraulic motor
6 boom
7 arm
8 bucket
9 bucket link
10 operating device
11 engine
12 operating room
15 flow rate control valve
16 load detection device
20 hydraulic pump
30 pilot pump
31 vehicle body inclination angle sensor
32 revolving angle sensor 39 lock valve
40 controller
54 to 59 solenoid proportional valve
61 boom cylinder
62 boom angle sensor
71 arm cylinder
72 arm angle sensor
81 bucket cylinder
82 bucket angle sensor
90 communication device
91 vehicle-mounted camera
100 remote operation system
143a pump line
144a to 149b pilot line
150a to 155b hydraulic drive unit
160 solenoid valve unit
170 tank
200 remote operation device
201 remote operation control device (control device)
202 display device
203 remotely operating device
204 operating seat
211 communication interface
212 central processing unit (CPU)
213 read only memory (ROM)
214 random access memory (RAM)
215 input interface
216 output interface
220 predicted trajectory computing section
221 display control section
222 communication control section
223 communication state determination section (second embodiment)
224 communication state transmission section (second embodiment)

The invention claimed is:

1. A remote operation device including a control device that transmits an operation signal to a work machine with an articulated work device to operate the work machine from a remote location, wherein the control device comprises:
    a communication control section that receives a camera video image of a work site captured by a camera and vehicle body information of the work machine;
    a predicted trajectory computing section that computes a predicted trajectory of the work device from the vehicle body information and outputs predicted trajectory data to be displayed as a video image on a display device; and
    a display control section that creates, on the basis of the predicted trajectory, a pseudo camera video image that draws the predicted trajectory of the work device as viewed from the camera, and causes the display device to superpose and display the camera video image and the pseudo camera video image of the predicted trajectory on a same screen.

2. The remote operation device according to claim 1, further comprising a communication state determination section that determines a transmission state of a communication line between the work machine and the remote operation device from a difference between the camera video image and the pseudo camera video image.

3. The remote operation device according to claim 2, wherein the communication state determination section causes the display device to display a determination result of the transmission state of the communication line.

4. The remote operation device according to claim 2, further comprising a communication state transmission section that transmits a determination result of the transmission state of the communication line to the work machine.

5. The remote operation device according to claim 2, further comprising a communication state transmission section that transmits a determination result of the transmission state of the communication line to the work machine when the communication state determination section determines occurrence of a communication failure.

* * * * *